Patented Jan. 9, 1951

2,537,016

UNITED STATES PATENT OFFICE 2,537,016

HETEROPOLYMERS OF VINYL AROMATIC COMPOUNDS, ALKYL ACRYLATES, AND ALKYL HALF ESTERS OF ETHYLENE DICARBOXYLIC ACIDS AND PROCESS OF PREPARING SAME

Gerald R. Barrett, Winchester, Mass., assignor to Monsanto Chemical Company, St. Louis, Mo., a corporation of Delaware No Drawing. Application January 22, 1947, Serial No. 723,658

15 Claims. (Cl. 260—78.5)

The present invention relates to synthetic resins and a process of preparing the same.

More particularly, the present invention relates to the preparation of copolymers of polymerizable vinyl compounds possessing the structural formula of $R-CH=CH_2$, where R is a phenyl or substituted phenyl radical with an alkyl arcylate and an alkyl half ester of an ethylene $\alpha,\beta$ dicarboxylic acid, as well as the resinous product so obtained, and their adaptation to coating compositions and plastics.

An object of this invention is then to provide a process for the manufacture of reaction products, resins or copolymers of vinyl compounds possessing the structural formula of $R-CH=CH_2$, where R is a phenyl or substituted phenyl radical with an alkyl acrylate and an alkyl half ester of an ethylene $\alpha,\beta$ dicarboxylic acid.

A further object of this invention is to provide a new resin or copolymerization product.

A further object is to provide a new coating composition.

Other and further objects will be apparent as herein disclosed.

It is well-known to prepare copolymers of styrene and its related substances with alkyl acrylates, and such copolymers have desirable properties for certain uses. However, the copolymers so obtained from the two monomers are not adaptable for certain uses and modification is frequently necessary. In accordance with this invention it has been found that an improved product is obtained by modification of the product obtained from polymerizing vinyl compounds having the structural formula of $R-CH=CH_2$ as defined herein with an alkyl acrylate, by copolymerizing said monomers with a half ester of an ethylene $\alpha,\beta$ dicarboxylic acid, and more particularly by copolymerizing a maleic half ester derived from an alcohol having four or more carbon atoms, and preferably a maleic half ester derived from a secondary alcohol. For the preparation of a flexible polymer at low cost methyl hexyl carbinol, frequently called capryl alcohol, is especially useful as the alcohol in preparing the maleic half ester.

The compounds of this invention find uses generally in the paper, textile and leather finishing fields, and are particularly adapted for providing coating compositions.

Moreover, the compounds of this invention are generally capable of vulcanization or curing in the presence of materials showing polyreactivity for carboxyl groups, such as polyreactive amines and alcohols, for example, polyethylene amines, polyglycols, polyvinyl alcohol, and melamine-formaldehyde resin.

As a specific example of this invention capryl acid maleate is prepared by heating at 80–90° C. substantially equimolecular quantities of maleic anhydride and capryl alcohol, plus about 0.25 mole of crude maleic acid with included capryl acid maleate, by-product from a previous preparation of the ester. On attainment of constant acid value there is added 0.1 mole of water and the mixture allowed to cool slowly with gentle agitation for deposition of maleic acid crystals. After removal of these crystals by filtration there is left a crude acid maleate having about the following composition:

90% capryl acid maleate
3.5% di-capryl maleate
3.0% capryl alcohol plus other neutral impurities in the alcohol
2.0% maleic acid
1.5% water The capryl acid maleate was reacted with styrene and ethyl acrylate as hereinafter described.

143 parts by weight of ethyl acrylate and 34 parts by weight of styrene were admixed and washed three times with half volumes of a fresh 0.2% $Na_2S_2O_5$–0.5% NaOH aqueous solution in order to remove any polymerization inhibitors in the commercial monomers. To the washed styrene-ethyl acrylate monomer mixture there was added 111 parts by weight of the above crude capryl acid maleate and most of the maleic acid impurity was removed by a single extraction with a half volume of water. The combined monomers were then placed in a flask equipped with stirrer and nitrogen inlet and intimately admixed with a solution comprising:

380 parts by weight of water
12 parts by weight of sodium lauryl sulfate
0.03 part by weight of $FeSO_4 \cdot 7H_2O$
6.0 parts by weight of 30% $H_2O_2$ Reaction is initiated by heating at 40 to 50° C., sweeping out all air from the apparatus and maintaining an atmosphere of nitrogen, and is allowed to proceed at a steady temperature of 40° C. With the reaction started, addition of a mixture of 78 parts by weight of styrene and 64 parts by weight of ethyl acrylate, washed with alkaline sulfite as above, together with 210 parts by weight of a 3% aqueous solution of sodium lauryl sulfate is begun. The addition of the styrene-acrylate is made at the rate of about 15 parts by weight per hour for the first four hours, and then at a progressively lower rate so as to complete the addition thereof in about 16–20 hours, with sodium lauryl sulfate solution added at a rate of 1.5 times as fast, pre-mixed with the organic phase by vigorous stirring. Reaction is completed by heating for three hours at 60–70° C.

After straining out any small content of polymer lumps, the translucent, thin dispersion may be used as such, to deposit a clear, flexible film, or may be pigmented, e. g., for use as a binder for pigment coatings on paper. Vulcanization of the coating to a solvent- and heat-resistant product may be effected by baking in the presence of materials possessing polyreactivity for carboxyl groups such as polyreactive amines and alcohols, for example, polyethylene amines, polyglycols, polyvinyl alcohol and melamine-formaldehyde resin.

A polymer prepared from a composition comprising substantially 28% styrene, 47% ethyl acrylate and 25% capryl maleate is of particular interest for the depositing of films from dispersions thereof.

Moreover, such a polymer finds particular use as a binder for pigment coatings on paper. Thus, a clay slip at 70% solids had added to it an amount of resin equal to 12% on the clay as 40% solids resin dispersion. Additional water was added to give a 60–65% total solids coating color. The coating was applied to a coating raw stock by means, for example, of an air knife coater or a roll coater. After application, the sheet was super-calendered to such gloss as is required by the industry. The paper so coated and calendered was tested for pick by method of the "Technical Association of Pulp and Paper Industry," Standard T-459m-45 and found to be satisfactory for printing purposes. The treated sheet also provided a surface with an excellent wet rub such as is required for offset lithography.

Among other polymers of this invention which have been found desirable as pigment binders for coated papers, there have been employed polymers prepared by reacting or copolymerizing varying amounts of vinyl compounds having the formula of $R-CH=CH_2$, where R is a phenyl or substituted phenyl radical, alkyl acrylates and alkyl half esters of ethylene $\alpha,\beta$ dicarboxylic acids. Thus, compounds have been prepared from compositions comprising 40% styrene, 35% ethyl acrylate, 25% capryl acid maleate; 20% styrene, 60% ethyl acrylate and 20% capryl acid maleate and employed with varying amounts of clay as a binder for pigment coatings on paper.

In the example given above and in the other examples, other polymerization catalysts, dispersing agents and the like may be employed. Thus, if desirable, benzoyl peroxide and the like may be employed as catalysts. Again, in place of sodium lauryl sulfate as dispersing agent, there may be employed the various long chain alkyl benzene sodium sulfonates and the like. This will be obvious to those skilled in the art to which this invention pertains.

The polymer dispersion as mentioned above may be coagulated as are synthetic rubber latices suitably by the addition of substances such as aluminum sulfate in solution. The coagulated polymer is thrown down as a rubber mass and may be washed and otherwise worked up by methods well-known in the rubber art. The purified polymer may then be dissolved in a suitable solvent or solvents such as alcohol-hydrocarbon mixtures and these solutions used in the manufacture of coatings, cements and the like.

If convenient or desirable, the polymers of this invention may be prepared by polymerizing the substances in solution. Moreover, it is possible to prepare substances of this invention by polymerizing in mass, that is, in the absence of solvent or dispersing media.

As other specific examples of the products of this invention, in place of styrene, halogen substituted styrene such as, for example, chlor styrene, and methyl styrene, are polymerized with alkyl acrylates and alkyl half esters of an ethylene $\alpha,\beta$ dicarboxylic acid. Also in place of ethyl acrylate, the alkyl acrylates generally are used, although it is preferred that alkyl radicals having from 1 to 8 carbon atoms such as methyl, propyl, butyl, amyl, hexyl, heptyl and octyl esters be employed. Again, in place of capryl acid maleate, other alkyl acid esters of ethylene $\alpha,\beta$ dicarboxylic acids, such as the butyl, amyl, hexyl and heptyl half esters of maleic acid, fumaric acid, citraconic acid, phenyl maleic acid, benzyl maleic acid, and ethyl maleic acid are used. These polymeric products are obtained generally according to the process hereinbefore described.

In the preparation of the polymeric materials of this invention, the proportion of the three monomeric substances may be widely varied. Thus, there may be employed preferably 10% to 85% by weight of a polymerizable vinyl compound possessing the structural formula of $R-CH=CH_2$, as herein defined, 10% to 85% by weight of alkyl acrylate and 5% to 60% by weight of an alkyl half ester of an ethylene $\alpha,\beta$ dicarboxylic acid. Where the polymer is formed from compositions comprising lower proportions of alkyl acrylate, it is frequently desirable to employ a plasticizer in order to provide a more highly plastic substance.

The above specific examples are to be understood as illustrative and not limitative of the scope of this invention.

What is claimed is:

1. The synthetic resin consisting of the polymerization product of a mixture comprising 10 to 85% by weight of styrene, 10 to 85% by weight of an alkyl acrylate having from 1 to 8 carbon atoms in the alkyl group and 5 to 60% by weight of a secondary alkyl half ester of an ethylene $\alpha,\beta$-dicarboxylic acid, which half ester has from 4 to 8 carbon atoms in the alkyl group.

2. The synthetic resin consisting of the polymerization product of a mixture comprising 10 to 85% by weight of styrene, 10 to 85% by weight of ethyl acrylate and 5 to 60% by weight of capryl acid maleate.

3. A coating composition comprising an aqueous dispersion of the polymerization product of a mixture comprising 10 to 85% by weight of styrene, 10 to 85% by weight of an alkyl acrylate having from 1 to 8 carbon atoms in the alkyl group and 5 to 60% by weight of a secondary alkyl half ester of an ethylene $\alpha,\beta$-dicarboxylic acid, which half ester has from 4 to 8 carbon atoms in the alkyl group.

4. A coating composition comprising an aqueous dispersion of the polymerization product of a mixture comprising 10 to 85% by weight of styrene, 10 to 85% by weight of ethyl acrylate and 5 to 60% by weight of capryl acid maleate.

5. A coating composition comprising the polymerization product of a mixture comprising 10 to 85% by weight of a polymerizable vinyl compound having the structural formula $R-CH=CH_2$, where R is selected from the group consisting of phenyl, halogen substituted phenyl and methyl substituted phenyl radicals, 10 to 85% by weight of an alkyl acrylate having from 1 to 8 carbon atoms in the alkyl group and 5 to 60% by weight of a secondary alkyl half ester of an ethylene $\alpha,\beta$-dicarboxylic acid, which half ester has from 4 to 8 carbon atoms in the alkyl group, and an organic solvent for said polymerization product.

6. A process which comprises heating an aqueous emulsion of a mixture comprising 10% to 85% by weight of a polymerizable vinyl compound possessing the structural formula $R—CH=CH_2$, where R is selected from the group consisting of phenyl, halogen substituted phenyl and methyl substituted phenyl radicals, 10% to 85% by weight of an alkyl acrylate having from 1 to 8 carbon atoms in the alkyl group and 5% to 60% by weight of a secondary alkyl half ester of an ethylene $\alpha,\beta$ dicarboxylic acid, which half ester has from 4 to 8 carbon atoms in the alkyl group, said emulsion being heated until the compounds in said mixture are substantially interpolymerized.

7. A process which comprises heating an aqueous emulsion of a mixture comprising 10% to 85% by weight of styrene, 10% to 85% by weight of an alkyl acrylate having from 1 to 8 carbon atoms in the alkyl group and 5% to 60% by weight of a secondary alkyl half ester of an ethylene $\alpha,\beta$ dicarboxylic acid, which half ester has from 4 to 8 carbon atoms in the alkyl group, said emulsion being heated until the compounds in said mixture are substantially interpolymerized.

8. A process which comprises heating an aqueous emulsion of a mixture comprising 10% to 85% by weight of styrene, 10% to 85% by weight of an alkyl acrylate having from 1 to 8 carbon atoms in the alkyl group and 5% to 60% by weight of a secondary alkyl half ester of maleic acid, which half ester has from 4 to 8 carbon atoms in the alkyl group, said emulsion being heated until the compounds in said mixture are substantially interpolymerized.

9. The synthetic resin consisting of the polymerization product of a mixture comprising 10% to 85% by weight of a vinyl compound having the structural formula $R—CH=CH_2$, where R is selected from the group consisting of phenyl, halogen substituted phenyl and methyl substituted phenyl radicals, 10% to 85% by weight of an alkyl acrylate having from 1 to 8 carbon atoms in the alkyl group and 5% to 60% by weight of a secondary alkyl half ester of an ethylene $\alpha,\beta$ dicarboxylic acid, which half ester has from 4 to 8 carbon atoms in the alkyl group.

10. The synthetic resin consisting of the polymerization product of a mixture comprising 10% to 85% by weight of styrene, 10% to 85% by weight of an alkyl acrylate having from 1 to 8 carbons in the alkyl group and 5% to 60% by weight of a secondary alkyl half ester of maleic acid, which half ester has from 4 to 8 carbon atoms in the alkyl group.

11. A coating composition comprising an aqueous dispersion of the polymerization product of a mixture comprising 10% to 85% by weight of a vinyl compound having the structural formula $R—CH=CH_2$, where R is selected from the group consisting of phenyl, halogen substituted phenyl and methyl substituted phenyl radicals, 10% to 85% by weight of an alkyl acrylate having from 1 to 8 carbon atoms in the alkyl group and 5% to 60% by weight of a secondary alkyl half ester of an ethylene $\alpha,\beta$ dicarboxylic acid, which half ester has from 4 to 8 carbon atoms in the alkyl group.

12. A coating composition comprising an aqueous dispersion of the polymerization product of a mixture comprising 10% to 85% by weight of styrene, 10% to 85% by weight of an alkyl acrylate having from 1 to 8 carbon atoms in the alkyl group and 5% to 60% by weight of a secondary alkyl half ester of maleic acid, which half ester has from 4 to 8 carbon atoms in the alkyl group.

13. A process which comprises heating an aqueous emulsion of a mixture comprising 10 to 85% by weight of styrene, 10 to 85% by weight of ethyl acrylate and 5 to 60% by weight of capryl acid maleate, said emulsion being heated until the compounds in said mixture are substantially interpolymerized.

14. A process which comprises first forming an aqueous emulsion comprising 143 parts by weight of ethyl acrylate, 34 parts by weight of styrene, 99.9 parts by weight of capryl acid maleate, 3.9 parts by weight of dicapryl maleate, 385.9 parts by weight of water, a dispersing agent and a polymerization catalyst, heating the resulting mixture to a temperature of 40 to 50° C. to initiate the reaction, maintaining the emulsion at a temperature of 40° C., adding to the emulsion over a period of 16 to 20 hours a mixture containing sufficient ethyl acrylate, styrene and a 3% water solution of a dispersing agent to provide a final mixture comprising 207 parts by weight of ethyl acrylate, 112 parts by weight of styrene, 99.9 parts by weight of capryl acid maleate, 3.9 parts of dicapryl maleate and 589.6 parts by weight of water and heating the resulting mixture at a temperature of 60 to 70° C. to complete the reaction.

15. A synthetic resin consisting of the polymerization product of a mixture comprising 207 parts by weight of ethyl acrylate, 112 parts by weight of styrene, 99.9 parts of capryl acid maleate and 3.9 parts by weight of dicapryl maleate.

GERALD R. BARRETT.

REFERENCES CITED

The following references are of record in the file of this patent:

UNITED STATES PATENTS

| Number | Name | Date |
| --- | --- | --- |
| 2,047,398 | Voss et al. | July 14, 1936 |
| 2,279,881 | D'Alelio | Apr. 14, 1942 |
| 2,375,960 | Stoops | May 15, 1945 |